United States Patent
Lee et al.

(10) Patent No.: US 7,975,157 B2
(45) Date of Patent: Jul. 5, 2011

(54) HOST DEVICE WITH POWER-SAVING FUNCTION

(75) Inventors: Lian-Chun Lee, Hsinchu County (TW); Jian-Fan Wei, Yulan County (TW); Kuen-Bin Lai, Hsin-Chu (TW); Chi-Tai Wu, Taipei (TW); Chien-Hui Chen, Keelung (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 463 days.

(21) Appl. No.: 12/248,029

(22) Filed: Oct. 8, 2008

(65) Prior Publication Data

US 2010/0023789 A1    Jan. 28, 2010

(30) Foreign Application Priority Data

Jul. 24, 2008   (TW) .............................. 97128112 A

(51) Int. Cl.
*G06F 1/32* (2006.01)

(52) U.S. Cl. ............... 713/324; 713/321; 711/115
(58) Field of Classification Search .............. 710/301, 710/306, 311; 711/115; 713/300, 320–324, 713/340
See application file for complete search history.

(56) References Cited

U.S. PATENT DOCUMENTS

| | | | |
|---|---|---|---|
| 7,895,457 B2* | 2/2011 | Luo et al. ................. 713/322 |
| 2006/0138230 A1* | 6/2006 | Wurzburg ................ 235/435 |
| 2006/0208097 A1* | 9/2006 | Ando et al. .............. 235/492 |
| 2009/0182935 A1* | 7/2009 | Pizzarulli et al. ........ 711/103 |
| 2010/0257313 A1* | 10/2010 | Nishizawa et al. ....... 711/115 |

* cited by examiner

*Primary Examiner* — Glenn A Auve
(74) *Attorney, Agent, or Firm* — Winston Hsu; Scott Margo

(57) ABSTRACT

A card reader with power-saving function is used for being inserted with a memory card so that a computer can access the memory card through the card reader. When the memory card is inserted in the card reader, the card reader is enabled to operate. On the other hand, when the memory card is not inserted in the card reader, the card reader enters to a power-down mode for saving power.

13 Claims, 1 Drawing Sheet

HOST DEVICE WITH POWER-SAVING FUNCTION

BACKGROUND OF THE INVENTION

1. Field of the Invention

The present invention relates to a host device, and more particularly, to a host device with power-saving function.

2. Description of the Prior Art

Nowadays either desktop computers or laptop computers are equipped with card readers for allowing users to insert memory cards so as to access data. When a memory card is inserted into the card reader, the card reader accesses the data of the memory card according to the commands from the computer. When the memory card is not inserted into the card reader, the conventional card reader still operates. In this way, the card reader still consumes power, causing power wasting. Take the laptop computer as an example, when the power source for the laptop computer is the battery, the efficiency of the power consumption of the laptop computer becomes much more important. However, the conventional card reader cannot save power when the conventional card reader is not inserted with the memory card, causing the reduction of the efficiency of the power consumption of the laptop computer, and consequently the usable time of the laptop computer is reduced as well, which is inconvenient.

SUMMARY OF THE INVENTION

The present invention provides a host device with power-saving function. The host device comprises a first interface for coupling to an external device and accordingly generating a first signal; a second interface for coupling to a corresponding first port of a south bridge chip of a chip set of a host and receiving a second signal transmitted from the south bridge chip; a third interface for coupling to a corresponding second port of the south bridge chip of the chip set of the host; a logic gate coupled to the first interface and the second interface for generating a third signal according to the first signal and the second signal; a physical layer processing device coupled to the third interface and the logic gate for processing signals received on the third interface according to the third signal; a digital logic processing device coupled to the first interface and the logic gate for processing signals received on the first interface according to the third signal; and a controller coupled to the second interface and the logic gate for transmitting a fourth signal to the south bridge chip of the chip set of the host according to the third signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
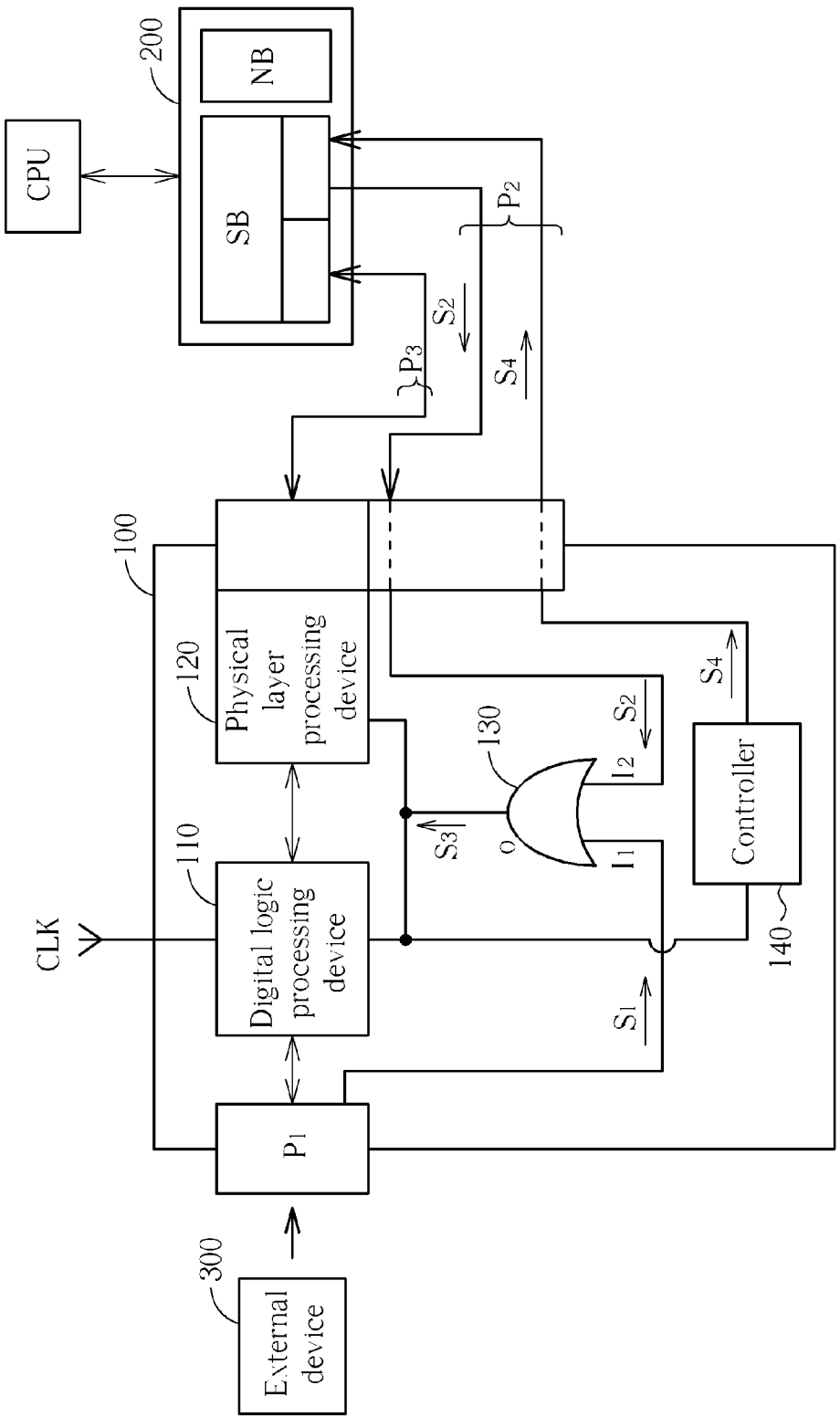
FIG. 1 is a diagram illustrating a host device with power-saving function according to the present invention.

Please refer to FIG. 1. FIG. 1 is a diagram illustrating a host device 100 with power-saving function according to the present invention. The host device 100 can be disposed in a laptop computer or a desktop computer (hereinafter "host"). As shown in FIG. 1, in the host, the mother board comprises a host device 100, a central processing unit CPU, and a chip set 200. The chip set 200 comprises a south bridge chip SB and a north bridge chip NB. The south bridge chip SB comprises two interfaces P2 and P3 for communicating with the devices of the mother board. The interface P2 can be a general purpose input/output port, or the like. The interface P3 can be Peripheral Component Interface (PCI), Peripheral Component Interface Express (PCIe), Universal Serial Bus (USB), or any other interface. The host device 100 is coupled to the south bridge chip SB of the chip set 200 and communicates with the central processing unit CPU through the interfaces P2 and P3. The host device 100 is disposed for coupling to an external device 300. For example, when the host device 100 is a card reader, the external device 300 is accordingly to be a memory card. When the external device 300 is coupled to the host device 100, the host device 100 provides the central processing unit CPU to access the data stored in the external device 300.

The host device 100 comprises three interfaces P1, P2, and P3, a digital logic processing device 110, a physical layer processing device 120, a logic gate 130, and a controller 140.

The interface P1 of the host device 100 is disposed for coupling to the external device 300. The interface P2 of the host device 100 is disposed for coupling to the corresponding interface P2 of the south bridge chip SB. The interface P3 of the host device 100 is disposed for coupling to the corresponding interface P3 of the south bridge chip SB.

The logic gate 130 can be an OR gate, which comprises two input ends I1 and I2, and an output end O. The two input ends of the logic gate 130 are coupled to the interfaces P1 and P2 of the host device 100, respectively, for receiving the signal S1 transmitted from the external device 300 and the signal S2 transmitted from the south bridge chip SB. Thus, the logic gate 130 can execute operation on the signals S1 and S2 (OR operation) and output the calculation result as the signal S3 through the output end O of the logic gate 130. More particularly, either the south bridge chip SB transmits the signal S2 through the interface P2 or the external device 300 couples to the interface P1 of the host device 100 for transmitting the signal S1, the logic gate 130 outputs the signal S3.

The physical layer processing device 120 is coupled to the interface P3 of the host device 100, the digital logic processing device 110, and the output end O of the logic gate 130. The physical layer processing device 120 processes the signals of the physical layer on the interface P3 of the south bridge chip SB for allowing the digital logic processing device 110 to execute the following procedures. When the physical layer processing device 120 receives the signal S3, the physical layer processing device 120 enables the execution for physical layer signal processing. On the other hand, when the physical layer processing device 120 does not receive the signal S3, the physical layer processing device 120 stops the execution for physical layer signal processing, which means the physical layer processing device 120 does not function. In this way, the power consumed by the physical layer processing device 120 can be saved.

The digital logic processing device 110 is coupled to the interface P1 of the host device 100, the physical layer processing device 120, and the output end O of the logic gate 130, for processing the logic signals processed by the physical layer processing device 120 and accessing the data of the external device 300. The digital logic processing device 110 further receives a clock signal CLK for synchronization with the interface P3 of the south bridge chip SB. When the digital logic processing device 110 receives the signal S3, the digital logic processing device 110 starts the operation according to the clock signal CLK. On the other hand, when the digital processing device 110 does not receive the signal S3, the digital logic processing device 110 ignores the clock signal CLK and consequently stops the operation of the digital logic processing device 110. In this way, the power consumed by the digital logic processing device 110 can be saved. According to the equation for power consumption of the digital processing device 110: $W=f \times V2$, wherein W represents the power consumption of the digital processing device 110, f represents the frequency of the clock signal CLK, and V represents the voltage, it is known that the power consumption of the digital logic processing device 110 relates to the frequency of the received clock signal CLK. Therefore, when the digital logic processing device 110 ignores the clock signal CLK, the power consumption of the digital logic processing device 110 can be reduced to the lowest level. In this way, when the digital logic processing device 110 does not receive the signal S3, the power consumption of the digital logic processing device 110 can be reduced.

The controller 140 is coupled to the output end O of the logic gate 130 and the interface P2 of the host device 100 for transmitting a signal S4 to the interface P2 of the south bridge chip SB according to the signal S3. That is, when the host device 100 is activated (the signal S3 is generated), the controller 140 transmits the signal S4 to the interface P2 of the south bridge chip SB for informing the central processing unit CPU that the host device 100 starts to operate; on the other hand, when the host device 100 is not activated (the signal S3 is not generated), the controller 140 stops transmitting the signal S4 to the interface P2 of the south bridge chip SB for informing the central processing unit CPU that the host device 100 is currently in the sleep mode.

The feature of the host device 100 of the present invention is: when the external device 300 is coupled to the host device 100 (the signal S1 is generated), the host device 100 of the present invention starts to operate; on the other hand, when the external device 300 is not coupled to the host device 100 of the present invention (the signal S1 is not generated), the host device 100 enters sleep mode for reducing power consumption (the digital logic processing device 110 stops receiving the clock signal CLK, and the physical layer processing device 120 stops processing the physical layer signals of the interface P3). For example, when the host device 100 is in the operation mode, the power consumption is about 60 milli-amperes; when the host device 100 is in the sleep mode, the power consumption is about 1 milli-ampere, which is reduced greatly. Thus, when the power source of the host is only a battery, the limited power provided by the battery can be efficiently utilized by the host device 100 of the present invention, providing longer useable time for users.

Furthermore, the central processing unit CPU transmits the signal S2 to activate the host device 100 through the interface P2 of the south bridge chip SB. For example, when the power source of the host is an AC/DC converter instead of a batter, which means the power consumption is not an issue, the central processing unit CPU can continuously transmits the signal S2 through the interface P2 of the south bridge chip SB to the host device 100 for keeping the host device 100 in the operation mode, which provides greater flexibility to users.

Additionally, in the present invention, when the signals S1, S2, S3, and S4 are generated, it means the voltages of the signals S1, S2, S3, and S4 are at high voltage levels; on the other hand, when the signals S1, S2, S3, and S4 are not generated, it means the voltages of the signals S1, S2, S3, and S4 are at low voltage levels. The way of the generating of the signals and the determination for the voltage level in the present invention is only disclosed as an exemplary embodiment while other kinds of designs can be applicable as desired.

To sum up, the host device of the present invention reduces the power consumption when the external device is not coupled to the host device of the present invention, providing greater convenience.

Those skilled in the art will readily observe that numerous modifications and alterations of the device and method may be made while retaining the teachings of the invention.

What is claimed is:

1. A host device with power-saving function comprising:
   a first interface for coupling to an external device and accordingly generating a first signal;
   a second interface for coupling to a corresponding first port of a south bridge chip of a chip set of a host and receiving a second signal transmitted from the south bridge chip;
   a third interface for coupling to a corresponding second port of the south bridge chip of the chip set of the host;
   a logic gate coupled to the first interface and the second interface for generating a third signal according to the first signal and the second signal;
   a physical layer processing device coupled to the third interface and the logic gate for processing signals received on the third interface according to the third signal;
   a digital logic processing device coupled to the first interface and the logic gate for processing signals received on the first interface according to the third signal; and
   a controller coupled to the second interface and the logic gate for transmitting a fourth signal to the south bridge chip of the chip set of the host according to the third signal.

2. The host device of claim 1, wherein the logic gate is an OR gate.

3. The host device of claim 1, wherein when the third signal is at a low voltage level, the physical layer processing device stops processing the signals received on the third interface.

4. The host device of claim 1, wherein when the third signal is at a low voltage level, the digital logic processing device stops processing the signals received on the first interface.

5. The host device of claim 1, wherein when the external device is coupled to the first interface, the first signal is at a high voltage level.

6. The host device of claim 1, wherein when the external device is not coupled to the first interface, the first signal is at a low voltage level.

7. The host device of claim 1, wherein when the host is coupled to an AC/DC converter, the second signal is kept at a high voltage level.

8. The host device of claim 1, wherein when the host is not coupled to an AC/DC converter, the second signal is at a low voltage level.

9. The host device of claim 1, wherein the fourth signal transmitted from the controller informs the south bridge chip of the chip set of the host if the host device is in sleep mode.

10. The host device of claim 1, wherein the digital logic processing device receives a clock signal for operation.

11. The host device of claim 10, wherein the third signal is at a low voltage level, the digital logic processing device ignores the clock signal and accordingly stops operating.

12. The host device of claim 1, wherein the host device is a card reader.

13. The host device of claim 12, wherein the external device is a memory card.

* * * * *